No. 2,970,137

Patented Jan. 31, 1961

2,970,137

METALLIZED MIXED AZO-DYESTUFFS

Herbert E. Whitlock, Clark, N.J., assignor to Verona-Pharma Chemical Corp., Bayonne, N.J., a corporation of New Jersey No Drawing. Filed Sept. 9, 1958, Ser. No. 759,857

2 Claims. (Cl. 260—145)

The present invention is directed to new metalliferous azo-dyestuffs, more particularly to those which contain one atom of chromium or cobalt bound in complex union with two molecules of different monoazo-dyestuffs.

Dyestuffs of this general character have been known and used for a considerable number of years. They are generally useful in the dyeing of wool. While such dyestuffs have been satisfactory to a certain extent, it has become evident that the properties could be improved. It is, therefore, among the objects of the present invention to devise dyestuffs of the character described which exhibit increased fastness to light and improved fastness to washing.

In practicing the invention there are provided two different monoazo dyestuffs, one of the dyestuffs being free from sulfonic acid groups, or substituted sulfonic acid groups such as sulfonamides, and alkyl sulfones, and free from carboxylic acid groups other than those in ortho position to the azo linkage, which monoazo-dyestuff corresponds to the general formula:

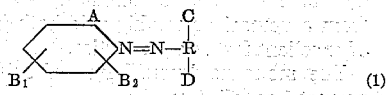

(1)

wherein R represents a naphthalene radical, which may carry one or two chlorine groups, and is attached to the azo group in a position vicinal to the group C; A represents hydroxy or carboxy groups; $B_1$ and $B_2$ represent hydrogen, halogen, nitro or acetylamino groups; C represents hydroxy, amino, alkyl- or arylamino groups; and D represents hydrogen, hydroxy or acylated amino groups, where the acyl group is the radical of formic, acetic, benzoic, methylcarbonic or ethylcarbonic acids.

The other monoazo-dyestuff is free from carboxylic acid groups other than those in the ortho position to the azo linkage but carries one free sulfonic acid group attached to an aliphatic chain, which monoazo-dyestuff corresponds to the general formula:

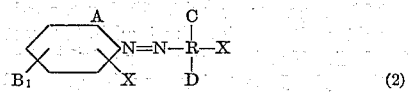

(2)

wherein R represents a naphthalene radical, which may carry 1 or 2 chlorine groups, A represents hydroxy or carboxy groups; B represents hydrogen, halogen, nitro or acetylamino groups; C represents hydroxy, amino, alkyl- or arylamino groups; D represents hydrogen, hydroxy or acylated amino groups, where the acyl group is the radical of formic, acetic, benzoic, methyl-carbonic or ethylcarbonic acids; and one X represents hydrogen and the other X is represented by the general formula:

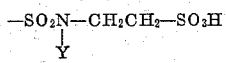

wherein Y represents hydrogen, methyl, ethyl, hydroxyethyl, cyclohexyl or phenyl groups.

The essence of the invention is the linkage of the free sulfonic acid group to the aliphatic radical which, in turn, is linked by a sulfonamide group to the carbon of the ring.

The monoazo-dyestuffs (1), free from sulfonic acid groups, or substituted sulfonic acids and free from carboxylic acid groups other than those in ortho position to the azo linkage, which serve as starting materials for the present dyes, can conveniently be prepared from the following representative diazo components:

(a)

4- or 5-chloro-2-amino-1-hydroxybenzene
4- or 5- or 6-nitro-2-amino-1-hydroxybenzene
4.6-dichloro-2-amino-1-hydroxybenzene
4-chloro-5 or 6-nitro-2-amino-1-hydroxybenzene
4-nitro-6-chloro-2-amino-1-hydroxybenzene
4-nitro-6-acetylamino-2-amino-1-hydroxybenzene
6-nitro-4-acetylamino-2-amino-1-hydroxybenzene
4.6-dinitro-2-amino-1-hydroxybenzene
2-aminobenzoic acid in conjunction with the following representative coupling components:

(b)

2-hydroxynaphthalene
2-aminonaphthalene
2-methylamino naphthalene
2-ethylamino naphthalene
2-hydroxyethylamino naphthalene
2-phenylamino naphthalene
8-acetylamino-2-hydroxynaphthalene
5-acetylamino-2-hydroxynaphthalene
8-formylamino-2-hydroxynaphthalene
5-formylamino-2-hydroxynaphthalene
8-benzoylamino-2-hydroxynaphthalene
5-benzoylamino-2-hydroxynaphthalene
8-carbethoxyamino-2-hydroxynaphthalene
5-carbethoxyamino-2-hydroxynaphthalene
5.8 dichloro-1-hydroxy naphthalene.

The monoazo-dyestuffs carrying the free sulfonic acid groups, which serve as the other starting materials for the present dyes can conveniently be prepared by coupling into the components set forth above under (b) with the following representative diazo components:

2-amino-1-hydroxybenzene-4- or 5-sulfonamido-N-omega-ethane sulfonic acid
2-amino-1-hydroxybenzene-4- or 5-sulfonamido-N-methyl-N-omega-ethane sulfonic acid
2-amino-1-hydroxybenzene-4- or 5-sulfonamido-N-ethyl-N-omega-ethane sulfonic acid
2-amino - 1 - hydroxybenzene-4- or 5-sulfonamido-N-hydroxyethyl-N-omega-ethane sulfonic acid
2-amino-1-hydroxybenzene-4- or 5-sulfonamido-N-phenyl-N-omega ethane sulfonic acid
4-chloro - 2 - amino - 1 - hydroxybenzene-5-sulfonamido-N-omega ethane sulfonic acid
4-chloro - 2 - amino - 1 - hydroxybenzene-5-sulfonamido-N-methyl-N-omega-ethane sulfonic acid
4-chloro - 2 - amino - 1 - hydroxybenzene-5-sulfonamido-N-ethyl-N-omega-ethane sulfonic acid
4-chloro - 2 - amino - 1 - hydroxybenzene-5-sulfonamido-N-hydroxyethyl-N-omega-ethane sulfonic acid
4-chloro - 2 - amino - 1 - hydroxybenzene-5-sulfonamido-N-phenyl-N-omega-ethane sulfonic acid
6-chloro - 2 - amino - 1 - hydroxybenzene-4-sulfonamido-N-omega-ethane-sulfonic acid
6-chloro - 2 - amino - 1 - hydroxybenzene-4-sulfonamido-N-methyl-N-omega-ethane sulfonic acid
6-chloro - 2 - amino - 1 - hydroxybenzene-4-sulfonamido-N-ethyl-N-omega-ethane sulfonic acid
6-chloro - 2 - amino - 1 - hydroxybenzene-4-sulfonamido- N-hydroxyethyl-N-omega-ethane sulfonic acid
6-chloro - 2 - amino - 1 - hydroxybenzene-4-sulfonamido-N-phenyl-N-omega-ethane sulfonic acid
4-nitro - 2 - amino - 1 - hydroxybenzene - 6 - sulfonamido-N-omega ethane-sulfonic acid
4-nitro - 2 - amino - 1 - hydroxybenzene - 6 - sulfonamido-N-methyl-N-omega-ethane sulfonic acid
4-nitro - 2 - amino - 1 - hydroxybenzene - 6 - sulfonamido-N-ethyl-N-omega-ethane sulfonic acid
4-nitro - 2 - amino - 1 - hydroxybenzene - 6 - sulfonamido-N-hydroxyethyl-N-omega-ethane sulfonic acid
4-nitro - 2 - amino - 1 - hydroxybenzene - 6 - sulfonamido-N-phenyl-N-omega-ethane sulfonic acid
6-nitro - 2 - amino - 1 - hydroxybenzene - 4 - sulfonamido-N-omega-ethane-sulfonic acid
6-nitro - 2 - amino - 1 - hydroxybenzene - 4 - sulfonamido-N-methyl-N-omega-ethane sulfonic acid
6-nitro - 2 - amino - 1 - hydroxybenzene - 4 - sulfonamido-N-ethyl-N-omega-ethane sulfonic acid
6-nitro - 2 - amino - 1 - hydroxybenzene - 4 - sulfonamido-N-hydroxyethyl-N-omega-ethane sulfonic acid
6-nitro - 2 - amino - 1 - hydroxybenzene - 4 - sulfonamido-N-phenyl-N-omega-ethane sulfonic acid.

In addition the monoazo-dyestuffs carrying the free sulfonic acid can conveniently be prepared by coupling diazo components set forth above under (*a*) into the following representative coupling components:

2-amino naphthalene-5- or 6-sulfonamido-N-omega- ethane sulfonic acid.
2-amino naphthalene-5- or 6-sulfonamido-N-methyl-N-omega-ethane sulfonic acid.
2-amino naphthalene-5- or 6-sulfonamido-N-ethyl-N-omega-ethane sulfonic acid
2-amino-naphthalene-5- or 6-sulfonamido-N-hydroxyethyl-N-omega-ethane sulfonic acid
2-amino naphthalene-5- or 6-sulfonamido-N-phenyl-N-omega-ethane sulfonic acid
2 - hydroxynaphthalene - 6 - sulfonamido - N - omega-ethane sulfonic acid
2 - hydroxynaphthalene 6 sulfonamido - N - methyl - N-omega-ethane sulfonic acid
2 - hydroxynaphthalene - 6 - sulfonamido - N - ethyl - N-omega-ethane sulfonic acid
2 - hydroxynaphthalene - 6 - sulfonamido - N - hydroxyethyl-N-omega-ethane sulfonic acid
2 - hydroxynaphthalene - 6 - sulfonamido - N - phenyl-N-omega-ethane sulfonic acid.

The various components specifically named above are to be considered as representative of the many compounds of the type described which are suitable for the invention, and they do not limit the invention to the specific compounds named.

The complex metalliferous dyestuffs of the present invention can be made by treating a mixture of substantially equimolecular quantities of the two different monoazo-dyestuffs, one of which corresponds to Formula 1 and the other to Formula 2, which dyestuffs are prepared using appropriate components from the lists shown, with an agent yielding metal in such a manner that the resulting metalliferous dyestuff contains one atom of metal bound in complex union with two molecules of different monoazo-dyestuffs namely (1) and (2).

In carrying out this process it is generally of advantage to treat a mixture of one molecular proportion of each of the two different dyestuffs with a quantity of an agent yielding metal corresponding to about 1 atomic proportion of metal, and carrying out the metallization in a weakly acid to strongly alkaline medium. Accordingly, there are especially suitable for carrying out the process those agents yielding metal which are stable to alkaline media. For example, cobalt compounds and especially chromium compounds of hydroxy carboxylic acids or dicarboxylic acids, which contain the metal in a complex union, in addition the alkali salts of chromic acid, can be used in the presence of reducing agents.

The conversion of the dyestuffs into the complex metal compounds is advantageously carried out in a water medium at a raised temperature under atmospheric or superatmospheric pressure. The finished products are isolated in the usual manner.

The new metal-containing dyestuffs are soluble in water and are suitable for dyeing and printing of a variety of materials, primarily however for the dyeing of materials such as wool and silk but also for the dyeing and printing of synthetic fibers such as superpolyamides and superpolyurethanes. They are especially suitable for dyeing from weakly alkaline, neutral or weakly acid bath. The wool dyeings thus obtainable are distinguished by good levelling capacity, by excellent light fastness and unexpectedly high wash fastness.

The following examples illustrate the invention, the parts being by weight unless otherwise stated and "1 mol" denoting, as is usual, the number of grams corresponding the molecular weight, and the relation between parts by weight and parts by volume being the same as that between the kilogram and the liter:

EXAMPLE 1

.1 mol of the dyestuff from diazotized 4-nitro-2-amino-1-hydroxy-benzene and 8-acetylamino-2-hydroxynaphthalene are slurried with .1 mol of the dyestuff from diazotized 2 - amino - 1 - hydroxybenzene - 4 - sulfonamido-N-methyl-N-omega-ethane sulfonic acid and 2-hydroxynaphthalene in water, the total volume being 4000 volume parts. This slurry is heated to 90° C. and is brought into solution with sodium hydroxide. To this is added a solution of 16.8 parts sodium bichromate, 20.2 parts dextrose in 200 parts water. The mixture is held at 90° C. until the metallization is completed.

The metallized dyestuff is isolated by the addition of sodium chloride, followed by filtration. When dry, the dyestuff is a water soluble dark powder, which dyes wool from a neutral or weakly acid bath in deep black shades of excellent fastness properties.

The monoazo-dyestuff free of sulfonic acid groups is prepared as follows:

15.4 parts 4-nitro-2-amino-1-hydroxybenzene are dissolved in 100 parts water and 29 parts of 30% hydrochloric acid. The solution is cooled to 10° C. and is diazotized with 6.9 parts of sodium nitrite. Into the formed diazo suspension there is run a solution of 20.1 parts 8-acetylamino-2-hydroxynaphthalene in 75 parts water and 17.5 parts sodium hydroxide. The coupling temperature is kept down with ice. When the coupling is completed the dyestuff is isolated by filtration and is analyzed.

The monoazo-dyestuff carrying the sulfonic acid group is prepared as follows:

31 parts 2-amino-1-hydroxybenzene-4-sulfonamido-N-methyl-N-omega-ethane sulfonic acid are suspended in 100 parts water with 17.5 parts of 30% hydrochloric acid and are diazotized with 6.9 parts sodium nitrite at 5° C. To the suspension of the diazo is added a solution of 15 parts beta naphthol in 100 parts water and 10 parts sodium hydroxide, the temperature being kept down with ice. When the coupling is completed the dyestuff is isolated with salt and is filtered. It is then analyzed.

The 2 - amino - 1 - hydroxybenzene - 4 - sulfonamido-N-methyl-N-omega-ethane sulfonic acid can be conveniently prepared by condensing 1-chloro-2-nitro-benzene-4-sulfonchloride in aqueous alkaline medium with methyltaurine ($CH_3NHCH_2CH_2SO_3H$), hydrolyzing the formed 2 - nitro - 1 - chlorbenzene - 4 - sulfonamido-N-methyl-N-omega-ethane sulfonic acid at elevated temperature with caustic to 2 - nitro - 1 - hydroxybenzene - 4 - sulfonamido - N - methyl - N - omega - ethane sulfonic acid, and finally reducing the so formed nitro compound with iron and acetic acid in an aqueous medium at 100° C. to the 2-amino-1-hydroxybenzene-4-sulmonamido-N-methyl-N-omega-ethane sulfonic acid.

In this synthesis the methyltaurine can be replaced with taurine, ethyltaurine, hydroxy-ethyltaurine, phenyltaurine or cyclohexyltaurine, when the following new amines are formed:

2 - amino - 1 - hydroxybenzene - 4 - sulfonamido - N-omega-ethane sulfonic acid.

2 - amino - 1 - hydroxybenzene - 4 - sulfonamido - N-ethyl-N-omega-ethane sulfonic acid.

2 - amino - 1 - hydroxybenzene - 4 - sulfonamido - N-phenyl-N-omega-ethane sulfonic acid.

2 - amino - 1 - hydroxybenzene - 4 - sulfonamido - N-cyclohexyl-N-omega-ethane sulfonic acid.

EXAMPLE 2

.1 mol of the dyestuff from diazotized 4-chloro-2-amino - 1 - hydroxybenzene and 8-acetylamino-2-hydroxynaphthalene are slurried with .1 mol of the dyestuff from diazotized 2-amino-1-hydroxybenzene-4-sulfonamido-N-ethyl-N-omega-ethane sulfonic acid and 1-hydroxy-5.8-dichloronaphthalene in water, the total volume being 4000 volume parts. This slurry is heated to 90° C. and is brought in solution with sodium hydroxide. The metallization and isolation are carried out as in Example 1.

When dry, the dyestuff is a water soluble dark powder which dyes wool from a neutral or weakly acid bath in deep blue-black shades having excellent fastness properties.

EXAMPLE 3

.1 mol of the dyestuff from diazotized 4-chloro-2-amino-1-hydroxybenzene and 8-acetylamino-2-hydroxynaphthalene are slurried with .1 mol of the dyestuff from diazotized 2-amino-1-hydroxybenzene-5-sulfonamido-N-cyclohexyl-N-omega ethane sulfonic acid and 2-hydroxynaphthalene in water, the total volume being 5000 volume parts. This slurry is heated to 90° C. and is brought into solution with sodium-hydroxide. The metallization and isolation are carried out as in Example 1.

When dry, the dyestuff is a water soluble dark powder which dyes wool from a neutral or a weakly acid bath in navy-blue shades having excellent fastness properties.

The 2-amino - 1 - hydroxybenzene - 5 - sulfonamido-N-cyclohexyl-N-omega-ethane sulfonic acid mentioned as one of the diazo components for the above dye can be prepared as follows:

Chloroethane sodium sulfonate is heated with an excess of cyclohexylamine to about 200° C. under pressure. The excess cyclohexylamine is removed by steam distillation and the resulting solution of cyclohexyltaurine is condensed with benzoxazalone-6-sulfonic acid chloride (oxa-1) to the corresponding sulfonamide which upon saponification with sodium hydroxide yields 2-amino-1-hydroxybenzene - 5 - sulfonamido - N - cyclohexyl-N-omega-ethane sulfonic acid.

EXAMPLE 4

.1 mol of the dyestuff from diazotized 4-nitro-2-amino-1-hydroxybenzene and 2-hydroxynaphthalene are slurried with .1 mol of the dyestuff from diazotized 2-amino - 1 - hydroxybenzene - 4 - sulfonamido - N - methyl-N-omega-ethane sulfonic acid and 8-acetylamino-2-hydroxynaphthalene in water, the total volume being 3000 volume parts. This slurry is heated to 90° C. and is brought in solution with sodium hydroxide. To this is added a solution of chromic tartrate corresponding to 8 parts $Cr_2O_3$. The mixture is held at 90° C. until the metallization is completed. The metallized dyestuff is isolated by the addition of sodium chloride and partial neutralization with hydrochloric acid, followed by filtration.

When dry, the dyestuff is a water soluble dark powder which dyes wool from a neutral or weakly acid bath in full black shades having excellent fastness properties.

The monoazo-dyestuff from diazotized 4-nitro-2-amino-1-hydroxybenzene and 2-hydroxynaphthalene can be replaced by the monoazo-dyestuff from diazotized 4-chlor-5-nitro-2-amino-1-hydroxybenzene and 2-hydroxy naphthalene. The resulting metallized dyestuff dyes wool in bluer shades than the one first described in this example.

EXAMPLE 5

.1 mol of the dyestuff from diazotized 5-nitro-2-amino-1-hydroxybenzene and 2-hydroxynaphthalene are slurried with .1 mol of the dyestuff from diazotized 4-nitro-2-amino-1-hydroxybenzene and 2-amino-naphthalene-6-sulfonamido-N-methyl-N-omega-ethane sulfonic acid in water, the total volume being 2000 volume parts. This slurry is heated to 90° C. and brought in solution with sodium hydroxide. To this is added a solution of 28 parts cobalt sulfate ($CoSO_4.7H_2O$) in 100 parts water and 136 parts ammonia 26° Bé. The mixture is held at 90° C. until the metallization is completed. The metallized dyestuff is isolated by the addition of sodium chloride, followed by filtration.

When dry, the dyestuff is a water soluble dark powder, which dyes wool from a neutral or weakly acid bath in deep greenish-black shades having excellent fastness properties.

The 2-amino naphthalene-6-sulfonamido-N-methyl-N-omega-ethane sulfonic acid can be obtained from 2-acetyl amino naphthalene-6-sulfonic acid chloride by treatment with a water solution of methyltaurine followed by an acid hydrolysis of the acetyl group.

The 5-nitro-2-amino-1-hydroxybenzene can be advantageously replaced with picramic acid. The final metallized dyestuff, dyes wool in full black shades.

EXAMPLE 6

.1 mol of the dyestuff from diazotized 4-nitro-2-amino-1-hydroxybenzene and 8 - acetylamino - 2 - hydroxynaphthalene are slurried in water with .1 mol of the dyestuff from diazotized 4-nitro-2-amino-1-hydroxybenzene and 2-aminonaphthalene - 5 - sulfonamido-N-methyl-N-omega-ethane sulfonic acid, the total volume being 3000 volume parts. This slurry is heated to 90° C. and brought in solution with sodium hydroxide. To this is added a solution of 28 parts cobalt sulfate ($CoSO_4.7H_2O$) in 100 parts water and 136 parts ammonia 26° Bé. The mixture is held at 90° C. until the metallization is completed. The metallized dyestuff is isolated by the addition of sodium chloride followed by filtration.

When dry, the dyestuff is a water soluble dark powder, which dyes wool from a neutral or weakly acid bath in deep black shades having excellent fastness properties.

The 2 - aminonaphthalene-5-sulfonamido-N-methyl-N-omega ethane sulfonic acid can be obtained from 2-acetylaminonaphthalene-5-sulfonic acid chloride by treatment with a water solution of methyltaurine, followed by an acid hydrolysis of the acetyl group.

What is claimed is:

1. A chromiferous azo-dyestuff composition prepared by metalizing two molecules of different monoazo-dyestuffs with a chromium compound in such a manner that the ratio of the complexly bound chromium to that of the azo components is substantially one to two, and the ratio of the two different monoazo-dyestuffs to each other is substantially one to one, one monazo-dyestuff corresponding to the general formula:

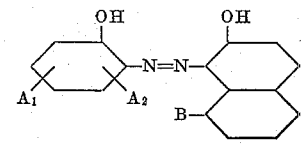

where $A_1$ and $A_2$ are members of the group consisting of hydrogen, halogen, and the nitro radical and B is a member of the group consisting of hydrogen and the acetyl amino radical; the other monoazo dyestuff corresponding to the general formula:

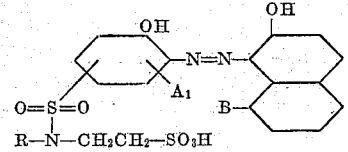

where $A_1$ and B are as above and R is a member of the group consisting of hydrogen, methyl, ethyl, hydroxyethyl, phenyl, and cyclohexyl radicals.

2. A chromiferous azo-dyestuff composition prepared by metallizing two molecules of different monoazo-dyestuffs with a chromium compound in such a manner that the ratio of the complexly bound chromium to that of the azo components is substantially two to one, and the ratio of the two different monoazo-dyestuffs to each other is substantially one to one, one of which corresponds to the formula:

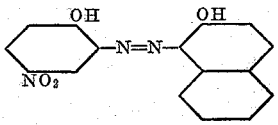

and the other monoazo-dyestuff corresponds to the formula:

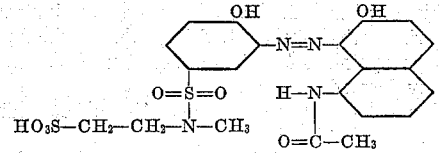

References Cited in the file of this patent

UNITED STATES PATENTS

| | | |
|---|---|---|
| 2,776,956 | Zickendraht et al. | Jan. 8, 1957 |
| 2,816,101 | Breig et al. | Dec. 10, 1957 |
| 2,824,867 | Keller et al. | Feb. 25, 1958 |
| 2,824,868 | Keller et al. | Feb. 25, 1958 |